OPEN-PORE POLYURETHANE PRODUCT

Original Filed May 28, 1969 2 Sheets-Sheet 1

United States Patent Office

Re. 27,917
Reissued Feb. 12, 1974

27,917

OPEN-PORE POLYURETHANE PRODUCT

Robert T. Jefferson, Columbus, Ind., and Ival O. Salyer, Dayton, Ohio, assignors to the United States of America as represented by the United States Atomic Energy Commission Original No. 3,574,150, dated Apr. 6, 1971, Ser. No. 828,647, May 28, 1969, which is a continuation-in-part of abandoned application Ser. No. 586,923, Oct. 17, 1966. Application for reissue Oct. 1, 1971, Ser. No. 185,643

Int. Cl. C08g *22/12, 22/44*

U.S. Cl. 260—2.5 BD 7 Claims

Matter enclosed in heavy brackets [ ] appears in the original patent but forms no part of this reissue specification; matter printed in italics indicates the additions made by reissue.

ABSTRACT OF THE DISCLOSURE

An open-pore polyurethane structure having a porosity of at least 50% and a density of 0.1–0.5 grams per cubic centimeter; and comprising coherent spherical particles of less than 10 microns diameter separated by interconnected interstices useful as a filter and oil-absorbent; and the method of producing said structure.

The invention described herein was made or conceived in the course of, or under, a subcontract with the United States Atomic Energy Commission.

This application is a continuation-in-part of our application Ser. No. 586,923, filed Oct. 17, 1966, and now abandoned, *and a reissue application of U.S. Pat. No. 3,574,150 issued Apr. 6, 1971· based on application Ser. No. 828,647, filed May 28, 1969·*

BACKGROUND OF THE INVENTION

The invention pertains to the production of porous resinous bodies and the resulting products, and particularly provides a process for forming an open-pore polyurethane structure.

Previously, porous polyurethane structures have been obtained as polyurethane foams whose preparation and chemistry are well summarized in the book by J. H. Saunders and K. C. Frisch, "Polyurethanes," Interscience Publishers, John Wiley and Sons, New York, 1962. Briefly, they are produced by reacting an organic diisocyanate with organic compounds having at least two active hydrogens, e.g., organic acids, amines, hydroxy compounds including glycols, and polyhydroxy compounds. The hydroxy compound may be, e.g., a diol or a polyol, a polyoxyalkylene glycol, a poly-ester prepared from such hydroxy compounds and having some unesterified hydroxy radicals, etc. The reaction may be conducted in the presence of water, which reacts with the diisocyanate to give off carbon dioxide to serve as gas for producing the foam, while simultaneously forming diamines for further reaction with the diisocyanate. A dicarboxylic acid, e.g., pimelic acid or sebacic acid may be used instead of water. Also, instead of depending upon evolution of carbon dioxide for producing the foam there may be used chemical blowing agents (e.g., azo compounds) or low boiling liquids such as trichlorofluoromethane. Catalysts may or may not be used, depending upon the nature of the individual reactants. However, a catalyst is usually needed to regulate the reaction rate, matching polymerization rate and resulting viscosity increase with gas evolution in order to assure trapping of the gas by the polymer structure. Examples of useful catalysts are tin compounds such as stannous oleate or dibutyltin diacetate and amines such as N-ethylmorpholine and triethylenediamine. Since foaming involves bubble nucleation, growth and stability, a surfactant, e.g., a silicone oil such as dimethylsiloxane may be used to effect nucleation and/or to stabilize the foam. The typical polyurethane foam-forming components are thus the diisocyanate, the polyol, the gas-providing compound or foam-precursor, the catalyst and the surfactant. However, with some diisocyanates and some polyols, rigid foams have been obtained from only the diisocyanate, the polyol and the foam-precursor or pneumatogen.

Polyurethane foams have been categorized in various ways. Considering the cell structure, there are either open-cell foams having interconnected cellular structure through which gases or liquids may pass, or closed-cell foams having separate non-connecting gas cells. In addition, foams may be of low or high density, depending upon the relative proportion of gas cells to solid polyurethane. By convention, foams having densities greater than three pounds per cubic foot are referred to as high density foams. Still another classification of foams is as rigid or flexible foams, the former showing resistance to deformation and the latter showing flexibility and resilience.

The rigid polyurethane foams known to the art have been generally prepared from polyols which would afford a highly branched or cross-linked structure. The rigid foams have generally had a closed cell structure comprising interconnected dodecahedra, usually with over 90% closed cells having intact membranes or walls. For applications such as filters, demanding an open cell structure, such products are obviously useless since there are few interconnecting passageways. In addition, typical rigid foams have shown permanent deformation at 10% deflection in the stress-strain relationship, which has limited their utility in structural applications.

The open-cell prior-art rigid polyurethane foams have generally been low density and consisted of interconnected struts left from the opening up of the dodecahedral cells originally formed at the foaming or blowing stage. When the cells are opened, the walls or membranes serving as common walls for adjacent dodecahedra are blown open and the material reformed as struts. Efforts to densify such rigid foams by compression, i.e., by application of a load sufficient to induce permanent set, has resulted in crushing layer by layer. The product therefore suffered from non-uniformity in pore structure and a structural weakness in the outer layers.

The processes used for preparing high density polyurethane foams have created serious problems because of the exothermic nature of the reaction. Unless provision was made for dissipating the heat, for example, by use of complex water-cooled molds or heat sinks, the cast polymer would become so overheated that it would char and decompose. In certain cases the mold itself has been overheated sufficiently to become distorted.

Various thermoplastic porous structures other than foams are known, having interconnecting pores and varying in pore sizes between 10 and 500 microns. Generally these suffer from their thermoplastic nature, i.e., they are softened and deformed by heat. Furthermore, they generally have limited resistance to acids or solvents.

SUMMARY OF THE INVENTION

An object of the invention is to prepare open-pore polyurethane structures having a porosity of at least 50% and a density of 0.1–0.5 grams per cubic centimeter, and comprising coherent spherical particles of less than 10 microns diameter separated by interconnected interstices. It is a further object to provide densifiable porous structures which retain uniform strength on densification. It is still a further object to provide a crosslinked polyurethane structure having superior wicking action for organic liquids. It is yet a further object to provide a process for casting open-pore polyurethane structures within a prescribed space.

These and other objects hereinafter defined are met by the invention wherein there is provided a method of preparing an open-pore polyurethane structure which comprises (a) preparing separate solutions of polyurethane-forming reactants comprising (1) a mixture of polyaryl polyalkylene polyisocyanates having the formula

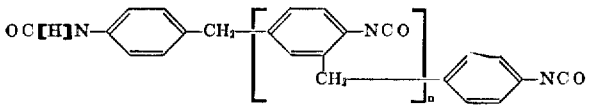

wherein $n$ has an average value of 0.5–2.0, containing about 40–50 percent diisocyanate, the balance being tri-, tetra- and pentaisocyanates, having a functionality of about 2.1–3.5, and (2) a polyol having a functionality of at least 3.0, in inert organic liquid diluents which form a homogeneous mixture in which the polyurethane produced herewith is substantially insoluble, (b) mixing the solutions to yield a homogeneous mixture of the reactants having a total concentration by weight of 10–30% and an NCO/OH ratio of 0.90–1.20, preferably 0.90–1.05, and ceasing said mixing before the onset of gelation, (c) thereafter maintaining said mixture in a quiescent state while the polyurethane solution gels, and (d) removing said organic liquid.

By "functionality" of the polyisocyanate is meant the average number of NCO groups per molecule. The isocyanate groups are conveniently determined by the "amine equivalent" method (ASTM D–1638–67T). The hydroxyl groups of the polyol are determined by appropriate methods (ASTM D–1638–67T) and usually reported as "hydroxyl number," i.e., the number of milligrams of potassium hydroxide equivalent to the hydroxyl content of 1 gram of the sample. The NCO/OH ratio is the equivalent weight of isocyanate groups present in the polyisocyanate reactant divided by the equivalent weight of hydroxyl groups present in the polyol reactant.

By "homogeneous" is meant a mixture that is essentially uniform. This can be determined by sampling and analysis. In some instances it can be demonstrated by the absence of visible striations characteristic of poorly mixed liquids having different refractive indices. Still another test is incorporation of a dye or coloring matter in one solution and observation of the uniformity of dispersion on mixing with a second solution.

By "gelation" is meant the change of state from the original usually clear solution to a gel or jelly, usually opaque. It is readily apparent as a visible phenomenon or may be detected by suitable viscosity measurements on segregated portions of the mixture, as with a Brookfield rotational viscometer, whereby a sharply rising viscosity indicates the onset of gelation.

Unlike the prior art products, the open-pore polyurethane structures comprise agglomerated coherent spherical particles rather than interconnected struts left from blown dodecahedral cells as in foam products. The present structures are remarkably uniform and have a high degree of porosity and can be obtained in a density varying from 0.1 to 0.5 gram per cubic centimeter. The structures are compressible and, for compressions of less than 20%, give full recovery. The structures are densifiable at compressions above 20%, with uniform compaction, resulting in improved strength over rigid foams for structural applications. Compaction of the present structures can be used to modify porosity and pore size without sacrificing uniformity.

The present structures may be made in a variety of pore sizes, usually less than 10 microns. The fine pore structure is considerably smaller than the finest foam cells known in the art, and consequently offers advantages over the foams in capillarity, as for example the wicking up of organic liquids. The product is admirably adapted to scavenging of crude oil from the surface of sea water by preferential wicking; the oil-soaked product may then be compresed to recover the oil or burned for disposal. The crosslinked polyurethane structures are remarkably solvent- and heat-resistant as compared with known thermoplastic structures. Because of their relative inertness they are useful filters, as for removing solids from gasoline, or tars from a gas stream. Furthermore, in contrast to thermoplastic materials, they are readily machinable without gumming up the machine cutting tool or saw blade.

The present process offers several advantages over prior art foam processes. First, it enables the porous structures to be cast in place, an especially desirable feature in filling complex shapes. This is a significant advantage, for example, in the construction of filters, where expensive machining and fitting would otherwise be required with foams. Because there is practically no shrinkage during gelation, precipitation and drying, the produced porous structure occupies the same volume as the homogeneous mix of reactants. Secondly, it permits the casting of large porous structures without the requirement of disposing of heat from the exothermic reaction usually characteristic of polyurethane foams.

BRIEF DESCRIPTION OF THE DRAWING

Some of the novel features of the present invention will become apparent from the following descriptions which are to be considered in connection with the accompanying photographs and drawing wherein:

In FIG. 1 the spherical polyurethane particles are approximately 1.6 microns in diameter; in FIG. 2, approximately 6.2 microns in diameter.

Figure 1:
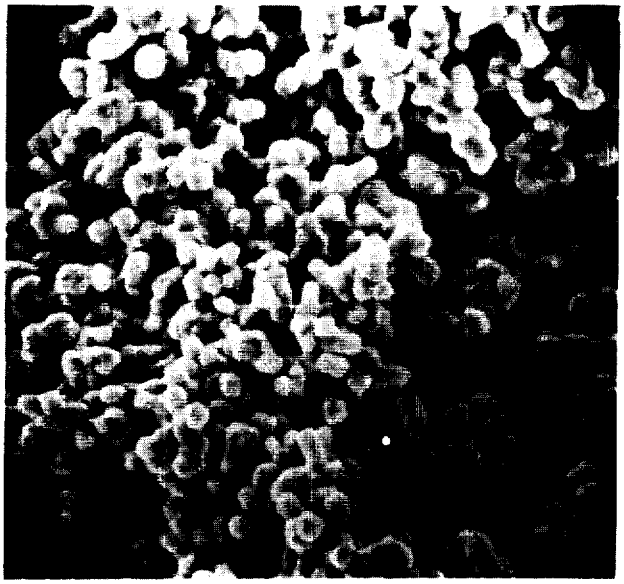
FIGS. 1 and 2 are photographs of two embodiments of open-pore polyurethane structures in which the coherent spherical particles are shown. Both photographs are at the same magnification and were obtained by use of a scanning electron microscope (Cambridge Stereoscan Mark II) using conventional techniques of sample preparation by gold-palladium evaporation.
Figure 2:
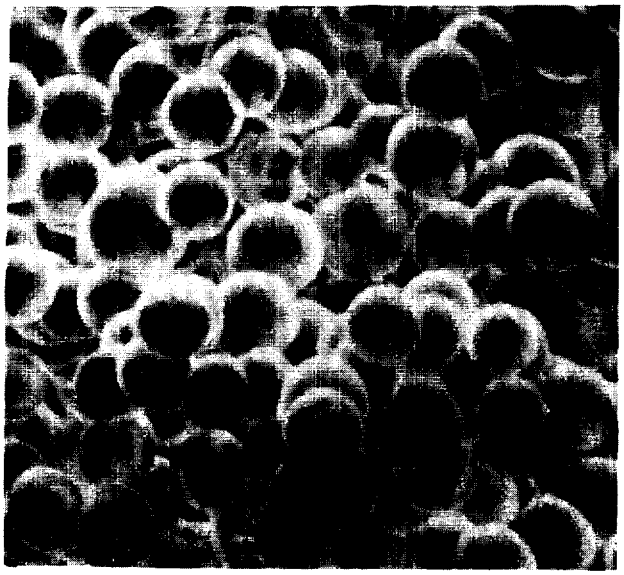

As is clearly apparent in FIGS. 1 and 2, the porous structure consists of spherical particles. It is also seen that many of the particles contact one or more other particles and many such "chains" of particles are present. Further, the pores between particles are of fairly uniform size and no unusually large pores or cracks are present.

Figure 3:
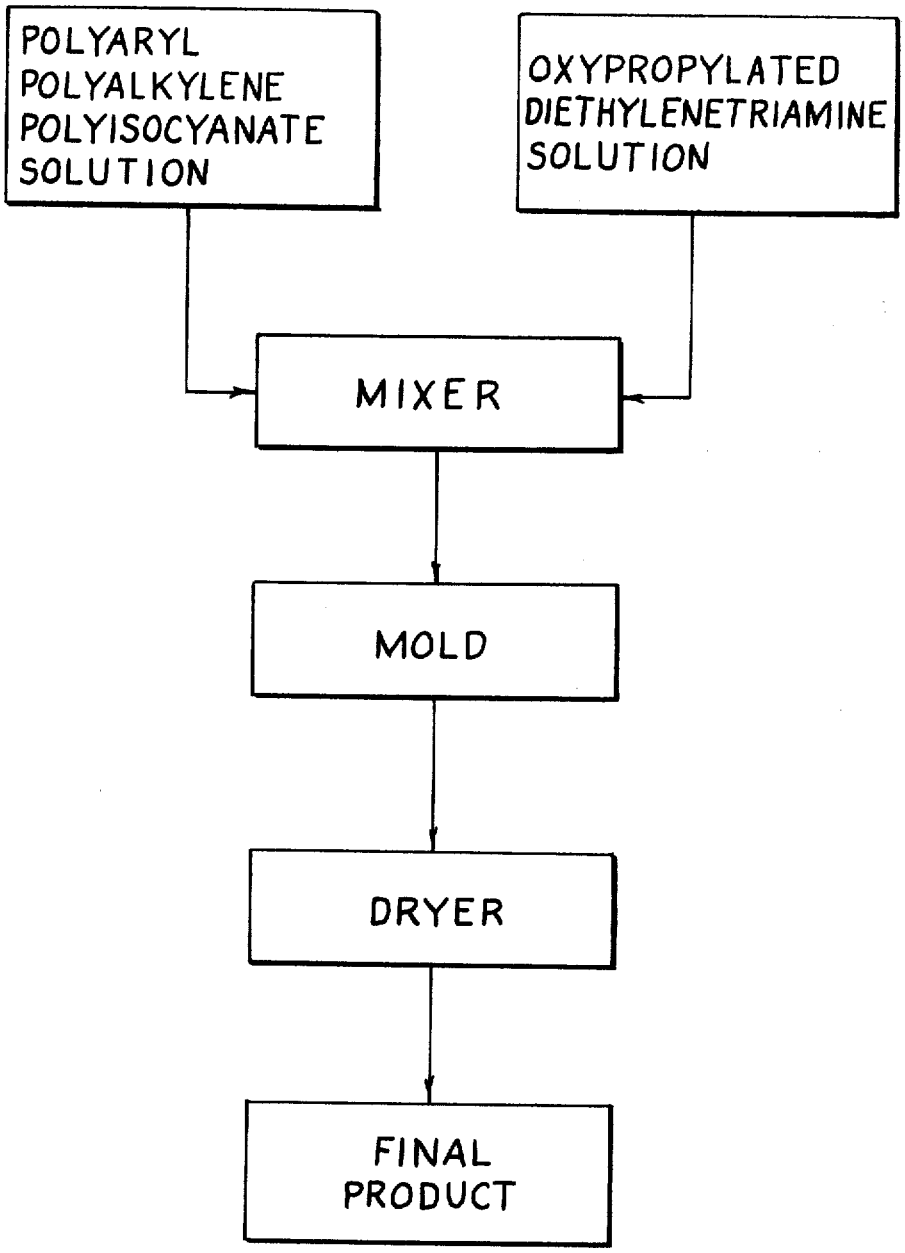

FIG. 3 represents a systematic flow diagram of the process carried out in accordance with the present invention.

DESCRIPTION OF THE PREFERRED EMBODIMENTS

This invention depends upon the relatively slow precipitation of a polyurethane from a quiescent homogeneous diluted mixture of the reactants. The following features are therefore critical: (a) the organic liquid diluent must serve as a nonsolvent for the polyurethane product, (b) the liquid diluent, or its components if a mixture, must be a suitable inert solvent for the reactants; and (c) the reactivity of the polyurethane-forming reactants must not be so great that precipitation of the polyurethane occurs before the mixture attains quiescence.

The organic liquid diluent may be selected from a wide variety of known materials which are unreactive toward isocyanates or polyols, e.g., hydrocarbons including pentane, cyclopentane, hexane, cyclohexane, nonane; aromatic hydrocarbons including benzene, toluene, xylene ethyl benzene, mesitylene, etc.; perfluoro compounds, including perfluoroheptane, perfluorobenzene, etc.; halogen compounds, including chloroform, carbon tetrachloride, 1,1,1-trichloroethane, butyl chloride, etc.; ketones, including acetone, methyl ethyl ketone, diethyl ketone, etc.; ethers, including diethyl ether, $\beta,\beta'$-dichloroethyl ether, dioxane, tetrahydrofuran, etc.; esters, including ethyl formate, ethyl acetate, butyl propionate, amyl butyrate ethyl benzoate, etc.; amides, including dimethyl formamide, dimethyl acetamide, etc.; nitro compounds, including nitroethane, nitropropane, nitrobenzene, etc.; and sulfur compounds, including dimethyl sulfide, diethyl sulfide, dimethyl sulfones, dimethyl sulfoxide, etc. The lower boiling organic compounds are preferred since they can be most readily removed by evaporation.

The organic liquid diluent should be one in which the polyurethane is substantially insoluble. Single liquids may be used, e.g., toluene, or mixtures of liquids, e.g., toluene with benzene, cyclohexane, tetrachloroethane, etc. The selection of diluents may be based on the "Solubility Parameter Concept." The solubility parameter, $\delta$, of each liquid is a characteristic constant defined as the square root of the cohesive energy density (cf. J. L. Gordon, J. Paint Tech. 38, 43 (1966)). For benzene, $\delta$ is 9.15; for toluene, 8.9, etc. Furthermore, two liquids having widely differening $\delta$ values may be mixed in suitable proportions to yield mixtures having acceptable or even superior solvent properties. To be nonsolvents for the polyurethane polymers included in the present invention, the solubility parameter of the organic liquid or mixture of liquids is preferably in the range 8.5–9.0. It is essential that the higher molecular weight polyurethane polymers be insoluble and precipitated in the organic liquid.

For simplicity it is desirable that the organic liquid diluent be a solvent for both types of reactants. The same liquid may then be used for both reactants. After the respective solutions have been prepared, mixed, and reacted, the organic liquid is readily recovered without costly separation. However, different liquids may be used for the respective reactants provided the resulting solutions can be combined to yield a homogeneous mixture.

The reactivity of the polyisocyanate and the polyol should generally be such that gelation of the polyisocyanate-polyol-organic liquid system occurs in a range of 5–60 minutes and preferably in 8–30 minutes. Too short a gelation time is apt to result in a weakened structure because condensation occurs before the system has reached a quiescent state; furthermore, shrinkage may be excessive. Too long a gelation time is unfavorable from a commercial and economic standpoint. The reactivity of the polyisocyanate and the polyol is related to a number of factors among which the most important are: their structure and the presence of substituent groups such as hydrocarbyl, halo, nitro, etc.

As the preferred polyisocyanate there is employed a mixture of polyaryl polyalkylene polyisocyanates having the formula

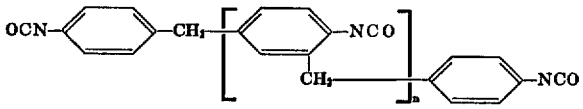

wherein n have an average value of 0.5–2.0, containing about 40–50 percent diisocyanate, the balance being tri-, tetra- and pentaisocyanates, having a functionality of about 2.1–3.5. Examples of other presently useful polyisocyanates are:

cyclohexylene-1,4-diisocyanate;
2,2-diphenylpropane-4,4'-diisocyanate;
3,3-dimethyldiphenylmethane-4,4'-diisocyanate;
1,4-naphthalene diisocyanate;
1,5-naphthalene diisocyanate;
diphenyl-4,4'-diisocyanate;
4,4',4''-triphenylmethane triisocyanate; and
4,4',4'',4'''-tetraphenylmethane tetraisocyanate.

Examples of polyols which may be employed with the polyisocyanates are: glycerine, sorbitol, pentaerythritol, and the ethylene and propylene oxide adducts of polyfunctional active-hydrogen compounds, such as glycerine, sorbitol, pentaerythritol, sucrose, trimethylolpropane, etc, having a functionality of at least 3.0. Preferred are the nitrogen-based polyether polyols obtained by totally oxypropylating an amine selected from the group consisting of amines having the formula $$NH_2—R—NH_2$$

where R is an alkylene radical containing from 2 to 6 carbon atoms and amines having the formula $$NH_2—(CH_2)_x—\left[\begin{matrix}N\\H\end{matrix}—(CH_2)_x\right]_y—NH_2$$

where x is an integer of from 2 to 3, and y is an integer of from 1 to 3. For example, N,N,N',N'-tetrakis(2-hydroxypropyl)ethylenediamine, the polyoxypropylene derivatives of 1,3-propanediamine, 1,4-butanediamine, 2,3-butanediamine, 1,3-pentanediamine, 1,5-pentanediamine, 1,2-hexanediamine, 1,6-hexanediamine, diethylenetriamine, triethylenetetramine, tetraethylenepentamine, dipropylenetriamine, etc. As further examples of the preferred polyols, are the polyol obtained by totally oxypropylating ethylenediamine having a molecular weight of about 275–300 and a hydroxyl number of about 750–800; and the polyol obtained by totally oxypropylating diethylenetriamine having a molecular weight of 400–600 and a hydroxyl number of about 450–800. It is preferred that the hydroxyl functionality of the polyol be at least 4.0. Suitable materials have been described in U.S. Pat. Nos. 2,626,915–19 and 2,697,118.

Other factors influencing the reactivity of the system are the presence of catalysts, e.g., tertiary amines, metal compounds, etc.; the nature of the solvent; the concentration of reactants in the solvent; the NCO/OH ratio of the system; and the temperature. If a given system has too short a gelation time, the above factors can be varied as compensation. Thus, the temperature may be lowered or the catalysts may be removed or neutralized. If gelation time is too long, conversely the temperature may be raised or catalysts added.

As catalysts there may be used accelerators for the reactions between polyisocyanates and the polyols, e.g., amines including N-methylmorpholine, triethylamine, triethylenediamine, etc., tin compounds include stannous chloride, tri-n-butyltin acetonate, di-n-butyltin diacetate, dimethyltin dichloride, etc. and others including ferric acetylacetonate. The catalyst may be present in very small proportions, e.g., in quantities of from 0.005 to 0.5 percent by weight of the total mix.

Generally, in preparing the porous polyurethane structure, according to this invention, solutions of the polyol and the di- or polyisocyanate are prepared separately in one or more organic liquid diluents, then mixed, poured into a mold or onto a surface and allowed to stand in a quiescent state while the polymeric structure is forming. However, when either the polyisocyanate or the polyol is a liquid, it may be added with a limited amount of stirring into the organic liquid diluent to which the other reactant has already been added, then left standing undisturbed until set. The reactants, once mixed, quickly begin to react, and shortly thereafter, depending upon the temperature, solids content, catalyst, etc. form a gel which is left undisturbed until the structure has set. The point in time at which gelation occurs is reproducible for a given set of conditions and may be easily determined by experimentation. It is essential for the formation of the porous structures that no stirring be done after this point. In prior art teachings, continuous stirring of polyurethane reactants in organic liquids has yielded either solutions of elastomers and film-forming polymers, or precipitates of particulate, granular resins, neither having the properties of the present products.

As an explanation for the unexpected results of the precipitation process disclosed herein, it is suggested that the following operations occur. It is not known with certainty whether they actually occur in this manner and whether they proceed in stepwise or continuous fashion.

First, it is believed that the polyisocyanate and polyol reactants interact to form liquid-soluble, short chain polymers. As the polymerization proceeds, the chain lengths and molecular weights increase, until the polymeric material is no longer soluble and acquires gel-like properties, i.e., is semi-dispersed in a swollen phase. Finally, as further reaction at the ends of the polymer chains yields even higher molecular weight material, this material is precipitated in situ. The freshly formed surfaces have excellent cohesion so that there are formed aggregated coherent, roughly spherical particles which stick together in an interconnected matrix. As a consequence, there is formed an open network of polymeric material, having the organic liquid trapped within the polymer. The enmeshed liquid is thereafter readily removed by evaporation or volatilization under reduced pressure.

The concentration of reacting solids in the mixture can be controlled by simply changing the amount of organic liquid which is present. Preferably the concentration should be between 15 to 30% solids by weight. If the concentration is appreciably less than 15%, the polyurethane matrix will be weak and fragile; if more than 30%, the gels will tend to split and crack so that poor structural properties result. Within limits, however, changing the concentration is a means of changing the density and porosity: the lower concentrations yield less dense and more porous products.

The reaction yielding the polyurethane is preferably done at room temperature, although somewhat higher or lower temperatures may be employed. Lower temperatures generally give less rigid structures, and higher temperatures are undesirable if convection currents become severe enough to disturb the setting gel. The polyurethane matrix when freed of organic liquid, may be further cured at moderate temperatures, e.g., 90° C. to 150° C., to remove odors or promote dimensional stability.

Because of the novel precipitation process by which these structures are formed, they have 100% open pore construction. Any one pore is freely communicating with another pore. The openings in the structure are irregular in shape. Neither in their appearance, nor in their properties, nor in their mode of formation do they resemble the cellular foams known in the art. Another significant difference is in their resistance to crushing, and the manner in which crushing occurs. The older cellular, rigid foams crush layer by layer at relatively constant stress, and have little or no recoverability. By contrast, a typical 12 lb./ft.$^3$ (0.19 g./cc.) open-pore rigid structure of the present invention shows substantially full recovery at 10% deflection, at approximately 370 p.s.i. in the standard foam strength test ASTM D 1621–59 T. Under further compression, the structure may be reduced under load of 1000–3000 p.s.i. to a permanent set. There is no crushing or shattering under this compression and the open-pore structure is retained. By this means, densities of about 40 lbs./ft.$^3$ (0.64 g./cc.) may be attained. Presumably the chainlike structure of spherical particles is rearranged under compression unlike the older rigid foams which collapse with fracture of their strut-like structure.

By virtue of the properties described above, the products of the present invention are useful as rigid structural fillers, molded packing materials, Christmas decorations, mannequins, etc. They may be used as filters for gases or liquids. They are useful oil-absorbents. They may be impregnated with solutions of fertilizers, dyes, insecticides, etc. or with powders or oils of biological toxicants for slow-release. They may be used as substrates for catalysts. They are useful in vibration- and sound-damping applications.

Whether or not other additives, including fillers, fire-retardants or coloring materials are used will depend upon the contemplated application of the porous polymer.

Additives such as catalysts, fillers, surfactants, etc. can be added to either the individual reactants before mixing or to the polyol-isocyanate reaction mixture before gelling.

Fillers which may advantageously be incorporated into the porous structure include both small and large size particulate fillers, (e.g., clay, sand, finely divided metals, metal oxides, carbon black, etc.) fibrous fillers (e.g., cotton, wool, silk, glass fibers, nylon, flexible urethane fibers and others) as well as low density foamed or hollow geometric shapes (e.g., spheres or honeycomb structures). Whereas conventional gas blown foams cannot be made to rise through the small interstices of filled structures, the low viscosity components of our invention will readily flow into such small interstices and polymerize therein.

The mix may or may not contain a surfactant. Useful surfactants include the silicone oils, and the nonionics such as the polyoxyalkylene glycol ether/esters.

It is not necessary for the success of this invention that water or a pneumatogen be present in the mixture in order to yield a porous structure. Generally it is preferable that substantial quantities of water be avoided in order to realize the highest yield of polymer from the isocyanates. However, the possibility of altering the properties of the product by using water or a pneumatogen is not excluded.

The invention is further illustrated by, but not limited to, the following examples.

EXAMPLE 1

This example illustrates the use of reactants having NCO/OH=1.00.

A solution of a polyol was prepared from 100 grams of a product resulting from the oxypropylation of diethylenetriamine, having a molecular weight of about 590, a hydroxyl number of about 480 and hydroxyl functionality of about 5.0 (hereinafter referred to as "LA–475") commercially available from Union Carbide Corporation, in 500 grams of toluene. A second solution of a polyisocyanate was prepared from 116 grams of a mixture of polyaryl polyalkylene polyisocyanates obtained by phosgenating the reaction product of aniline with formaldehyde, said mixture of organic polyisocyanates having the formula

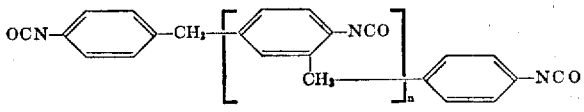

wherein n has an average value of 0.5–2.0, containing about 40–50 percent diisocyanate, the balance being tri-, tetra- and pentaisocyanates, in this instance having a functionality of about 2.5 and an equivalent weight of about 131 (hereinafter referred to as "crude MDI"), in 500 grams of toluene. The two solutions were mixed, stirred for less than a minute until homogeneous and quickly poured into a mold, where the mixture stood quietly as polymerization proceeded. About four hours later the polyurethane produced was removed from the mold and stored overnight in a ventilated area while the toluene evaporated. The compressive strength at 10% deflection, measured by ASTM D 1621–59 T, was found to be 370–385 p.s.i., with full recovery. The structure was found to have essentially 82% porosity, determined on an air comparison pycnometer, Beckman Model 930. The density of the cured product was 0.24 grams per cubic centimeter.

EXAMPLE 2

This example illustrates the use of a range of concentrations in toluene.

The procedure of Example 1 was used, using the same starting materials, wherein 100 grams of the polyol (LA–

475) and 116 grams of the polyisocyanate (crude MDI) were dissolved separately in approximately equal amounts of toluene having a total weight as shown in the following table corresponding to concentrations of 12–25% polymer reactants in toluene. Thus, in Run A 100 grams of the polyol was dissolved in about 792 grams of toluene, and 116 grams of the polyisocyanate in about 792 grams of toluene. The ratio of NCO/OH is 1.00 for each mixture. The respective solutions were mixed and stirred for not over one minute until homogeneous, poured into a mold and left undisturbed. After about four hours the product was removed from the mold and dried by evaporation of the solvent. The properties of the products are tabulated as follows:

| Run | Percent concentration by weight | Toluene, total weight, g. | Properties of product | | |
|---|---|---|---|---|---|
| | | | Density, g./cc. | Porosity [1] | Shore A Hardness [2] |
| A | 12 | 1,584 | 0.14 | 90 | 0 |
| B | 15 | 1,224 | 0.18 | 86 | 0 |
| C | 17 | 1,054 | 0.24 | 82 | 0 |
| D | 17.8 | 1,000 | 0.24 | 81 | 10 |
| E | 18.5 | 952 | 0.24 | 81 | 10 |
| F | 20 | 864 | 0.27 | 81 | 28 |
| G | 25 | 649 | 0.38 | 75 | 88 |

[1] Porosity determined with a Beckman Model 930 Air Comparison Pycnometer.
[2] Shore A Hardness determined by ASTM D 676.

The product of Example 2–A showed a compression strength of about 6 p.s.i. at 10% deflection.

The product of Example 2–B showed a surface area of 0.5 square meters/gram by the standard B-E-T method using nitrogen; the product of Example 2–F showed 0.8 square meters/gram.

The product of Example 2–C was examined by use of a scanning electron microscope and found to consist of agglomerated spherical particles approximately 1.6 microns in diameter, as depicted in FIG. 1.

The product of Example 2–G showed a compressive strength of 300 p.s.i. at 10% deflection. When compacted to approximately 50% of its initial height, its density increased to about 0.64 g./cc. and the product showed a compressive strength of 3000 p.s.i. measured at 10% deflection.

EXAMPLE 3

This example illustrates the use of carbon tetrachloride.

The procedure of Example 1 was used, using the same starting materials, with 100 grams of the polyol (LA–475) and 116 grams of the crude MDI dissolved separately in approximately equal amounts of carbon tetrachloride having a total weight as shown in the following table.

| Run | Percent concentration by weight | $CCl_4$, total weight, g. | Properties of product | | |
|---|---|---|---|---|---|
| | | | Density, g./cc. | Porosity | Shore A Hardness |
| A | 12 | 1,584 | 0.26 | 79 | 0 |
| B | 15 | 1,224 | 0.32 | 77 | 40 |
| C | 17 | 1,054 | 0.33 | 74 | 57 |
| D | 20 | 864 | 0.38 | 74 | 65 |

EXAMPLE 4

This example illustrates the use of xylene.

The procedure of Example 1 was used, using the same starting materials, with 70.8 grams of the polyol (LA–475) in 300 grams of xylene, and 79.2 grams of polyisocyanate (crude DMI) in 300 grams of xylene. This corresponds to an NCO/OH ratio of 1.0. The solutions were combined and stirred for 30 seconds until homogeneous. The mixture was then quickly poured into a mold and left undisturbed overnight. The firm porous product was removed from the mold and dried in a vacuum at about room temperature. The product had a density of 0.24 g./cc. and a porosity of 80%. Shore A hardness was 0.

EXAMPLE 5

This example illustrates the use of mixtures of solvents with toluene.

(A) Using toluene-carbon tetrachloride

A solution of 70.8 grams of the polyol (LA–475) in 300 grams of carbon tetrachloride was mixed with a solution of 79.2 grams of the polyisocyanate (crude MDI) in 300 grams of toluene. This corresponds to an NCO/OH ratio of 1.0. The mixture was stirred for 30 seconds and quickly poured into a mold. After standing overnight the product was dried to remove solvent, yielding a hard, white porous structure of uniform fine appearance. The product had a density of 0.36 g./cc. and a porosity of 74%. Shore A hardness was 79.

(B) Using toluene-JP–4

A solution of 16.8 grams of polyol (LA–475) in 50 grams of toluene and 50 grams of JP–4 (a jet engine fuel described as a mixture of gasoline and kerosene, Military Specification MIL–T–5624G) was mixed with a solution of 18.6 grams of polyisocyanate (crude MDI) in 50 grams of toluene and 50 grams of JP–4. The following are the characteristics of JP–4 fuel: Reed vapor pressure—2.20; API gravity—53.5; freezing point—max. −76° F.

ASTM D–86 distillation[′′] ° F.

| | |
|---|---|
| IBP | 140 |
| 10% | 251 |
| 20% | 278 |
| 30% | 300 |
| 50% | 326 |
| 80% | 383 |
| 95% | 445 |
| EP | 473 |

This corresponds to an NCO/OH ratio of 1.0. The usual procedure of mixing, molding, standing and drying as in Example 1 yielded a solid porous structure. The product had a density of 0.17 g./cc. and a porosity of 89%. Shore A hardness was 0.

The product of Example 5–B was examined by use of a scanning electron microscope and found to consist of agglomerated spherical particles approximately 6.2 microns in diameter, as depicted in FIG. 2.

The product from Example 5–B was tested as a cigarette filter and found to be significantly more efficient than the commonly used cellulose plug filters. Samples of this porous urethane product were cut to the same size as the cellulose filters (0.27 in. diameter x 0.55 in. length). The smoke from the cigarette, containing tar and nicotine, was slowly drawn through each of five samples of this product. For comparison, the same volume of smoke was drawn through each of five cellulose plug filters removed from various brands of cigarettes. The average weight gain for the porous urethane filters tested was 45%. The average weight gain for the cellulose filters was 33%.

EXAMPLE 6

This example illustrates the use of various NCO/OH ratios.

Quantities of polyol (LA–475) and polyisocyanate (crude MDI) were dissolved as separate solutions in toluene. The quantities taken were such as to give NCO/OH ratios of from 0.90 to 1.05 as follows.

(A) USING 18% SOLIDS CONCENTRATION

| NCO/OH | Properties of product | | |
|---|---|---|---|
| | Density, g./cc. | Porosity, percent | Shore A Hardness |
| 1.05 | 0.23 | 86 | |
| 1.00 | 0.24 | 81 | 10 |

(B) USING 25% SOLIDS CONCENTRATION

| NCO/OH | Properties of product | | |
|---|---|---|---|
| | Density, g./cc. | Porosity, percent | Shore A Hardness |
| 1.00 | 0.38 | 75 | 88 |
| 0.97 | 0.38 | 74 | 90 |
| 0.95 | 0.33 | 77 | 85 |
| 0.90 | 0.41 | 70 | 91 |

EXAMPLE 7

This example illustrates the use of a polyisocyanate with a functionality of about 3.2.

A solution of 82 parts of polyol (LA–475) in 500 parts by weight of toluene was mixed with a solution of 94 parts of polyisocyanate (a crude MDI having an average functionality of about 3.2 NCO groups per molecule, and an equivalent weight of about 134), in 500 parts by weight of toluene. This corresponds to an NCO/OH ratio of 1.0 and a solids concentration of 15%. After less than one minute of stirring the mixture was quickly poured into a mold and left to stand. After four hours the toluene-laden porous product was removed from the mold and dried. The product had a density of 0.18 g./cc. and a porosity of 88%.

EXAMPLE 8

This example illustrates the use of a polyisocyanate with a functionality of about 2.3.

A solution of 82 parts of polyol (LA–475) in 500 parts by weight of toluene was mixed with a solution of 93 parts of polyisocyanate (a crude MDI having an average functionality of 2.3 NCO groups per molecule having an equivalent weight of about 132), in 500 parts by weight of toluene. This corresponds to an NCO/OH ratio of 1.0 and a solids concentration of 15%. After less than one minute of stirring the mixture was poured into a mold and left to stand. After four hours the product was removed from the mold and the toluene was evaporated. Shrinkage was negligible and the product had a density of 0.17 g./cc. and a porosity of 89%.

EXAMPLE 9

This example illustrates the preparation of a 10-inch diameter porous cylinder 10 inches long, for shrinkage and wicking tests.

A solution of polyol was prepared by dissolving 1057 parts of LA–475 in 7000 parts of toluene. To this solution was added an isocyanate solution containing 1183 parts of crude MDI having a functionality of about 2.5 dissolved in 2830 parts of toluene at room temperature. The two solutions were mixed, stirred for less than a minute until homogeneous and poured into a mold, where the mixture stood quietly as polymerization proceeded. About 24 hours later the polyurethane product was removed from the mold and stored for two days in a ventilated area while the toluene evaporated. The NCO/OH ratio in this system is 1.0. The product had a density of 0.23 g./cc. and a porosity of 81%. The density gradient from top to bottom and from side to side was negligible (0.233±0.001 g./cc.).

A test was conducted to determine thermal contraction using a center section of the above product measuring 5.980 in. x 5.986 in. x 4.975 in. The sample was held at −22° C. for three days then remeasured cold. The new measurements were 5.980 in. x 5.985 in. x 4.952 in., which in terms of decrease in volume (percent shrinkage) is 0.25%. This shows that the product undergoes negligible shrinkage at low temperature.

Another test was run on this porous product to demonstrate absorbency, or capillary action. Bar-shaped samples ⅜ in. x ⅜ in. x 6 in. were cut from the above product. For comparison, two small-cell flexible polyurethane foam products were also used: Foam A had approximately 80–100 pores/inch rating and was the usual commercial cushion-type foam. Foam B had approximately 300 pores/inch and represents the finest cell structure in laboratory-produced polyurethane foam, with a pore size of approximately 75 microns. Samples from each of these three products were suspended above a vessel containing dioctyl phthalate liquid so that the lower ½ in. of each bar was immersed in the fluid. At equilibrium, liquid traveled 3/16 in.–¼ in. in Foam A, 1⅛ in.–1¼ in. in Foam B, and 5½ in. (the entire length) of the porous product of this example.

Still a further test was made to demonstrate preferential absorbence of oil over water. A block of the porous product, approximately 2½ in. x 1¾ in. x ⅜ in., was floated on water on which there was a layer of about 10 ml. of SAE–10 motor oil. The oil was quickly absorbed so that in about 2 minutes there was no longer oil on the surface of the water. A sample of the oil-soaked block burned readily when ignited with a match.

EXAMPLE 10

This example illustrates the use of a polyol having a molecular weight of about 400.

A solution of a polyol was prepared from 57 grams of a product resulting from the oxypropylation of diethylenetriamine, having a molecular weight of about 400 and a hydroxyl number of about 700 (hereinafter referred to as "LA–700") commercially available from Union Carbide Corporation, in 300 grams of toluene. A second solution of a polyisocyanate was prepared from 93 grams of a crude MDI having an average functionality of 2.3 NCO groups per molecule, in 300 grams of toluene. The two solutions were mixed at room temperature, stirred for about one minute, poured into a mold, and then allowed to stand for about 4 hours. The mixture gelled in 20 minutes. The solid product was removed from the mold and dried by evaporating the solvent. The product had a density of 0.23 g./cc. and a porosity of 85%. It was soft and resilient.

EXAMPLE 11

This example illustrates the use of a polyol obtained by oxypropylation of ethylenediamine.

A solution of a polyol was prepared from 54 grams of a product resulting from the oxypropylation of ethylene-diamine, having a molecular weight of about 292 and a hydroxyl number of about 776 (hereinafter referred to as "Quadrol") commercially available from Wyandotte Chemicals Corporation, in 300 grams of toluene. A second solution of a polyisocyanate was prepared from 96 grams of a crude MDI having an average functionality of 2.3 NCO groups per molecule, in 300 grams of toluene. The two solutions were mixed at room temperature for about one minute, poured into a mold and then allowed to stand for four hours. The mixture gelled in 20 minutes. The solid product was removed from the mold and dried by evaporating the solvent. The product had a density of 0.22 g./cc. and a porosity of 86%.

What is claimed is:

1. An open-pore polyurethane structure having a porosity of at least 50%, a density of 0.1–0.5 gram per cubic centimeter, [a compressive strength of at least 300 p.s.i. at 10% deflection for a structure with a density of about 0.2% g./cc., and substantially full recovery after 10% compression,] and comprising coherent spherical particles of less than 10 microns diameter separated by interconnected interstices wherein the polyurethane is the reaction product of (1) a mixture of polyaryl polyalkylene polyisocyanates having the formula

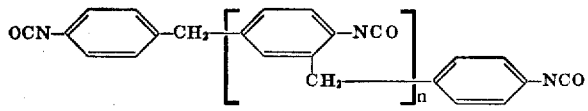

wherein n has an average value of 0.5–2.0, containing about 40–50 percent diisocyanate, the balance being tri-, tetra- and pentaisocyanates, having a functionality of about 2.1–3.5, and (2) a polyol having a functionality of at least 3.0.

2. A method for preparing an open-pore polyurethane structure having a porosity of at least 50%, a density of 0.1–0.5 gram per cubic centimeter, and comprising spherical particles of less than 10 microns diameter separated by interconnected interstices comprising the steps of:

(a) preparing separate solutions of polyurethane forming reactants in inert organic liquid diluents which are capable of forming a homogeneous mixture in which the polyurethane is substantially insoluble comprising:

(1) a solution of a first inert organic liquid diluent and a mixture of polyaryl polyalkylene polyisocyanates having a functionality of about 2.1–3.5 and containing about 40–50% diisocyanate, the balance being tri-, tetra-, and pentaisocyanates, said polyisocyanates having the formula

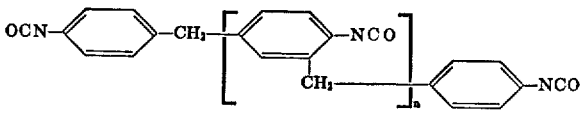

wherein n has an average value of 0.5–2.0, and (2) a solution of a second inert organic liquid diluent and a polyol having a functionality of at least 3.0 selected from (i) the reaction product of ethylene diamine and propylene oxide having a molecular weight of 275–300 and a hydroxyl number of about 750–800, and (ii) the reaction product of diethylenetriamine and propylene oxide having a molecular weight of 400–600 and a hydroxyl number of about 450–800;

(b) mixing solutions (1) and (2) and making a homogeneous mixture of the reactants having a total concentration of weight of 10–30% and an NCO/OH ratio of 0.90–1.05 and ceasing said mixing before the onset of gelation;

(c) thereafter maintaining the product of step (b) in a quiescent state while the polyurethane is precipitated; and (d) removing the inert organic liquid diluents.

3. The method of claim 2 in which the polyol is an oxypropylated ethylenediamine having a molecular weight of about 275–300 and a hydroxyl number of about 750–800.

4. The method of claim 2 in which the polyol is an oxypropylated diethylenetriamine having a molecular weight of 400–600 and a hydroxyl number of about 450–800.

5. The method of claim 2 in which the inert organic liquids are selected from the group consisting of toluene, xylene, carbon tetrachloride and JP-4 jet fuel.

6. The process of claim 2 wherein said first and second inert organic liquid diluents are the same material.

7. A method for preparing an open-pore polyurethane structure having a porosity of at least 50%, a density of 0.1–0.5 gram per cubic centimeter, and comprising spherical particles of less than 10 microns diameter separated by interconnected interstices comprising the steps of:

(a) preparing a homogeneous liquid mixture of polyurethane-forming reactants having a total concentration by weight of 10–30% and an NCO/OH ratio of 0.90–1.05 in an inert organic liquid diluent in which the polyurethane is substantially insoluble, wherein the reactants comprise (1) a mixture of polyaryl polyalkylene polyisocyanates having a functionality of about 2.1–3.5 and containing about 40–50% diisocyanate, the balance being tri-, tetra-, and pentaisocyanates, said polyisocyanates having the formula

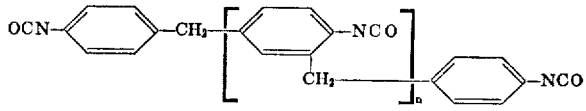

wherein n has an average value of 0.5–2.0, and (2) a polyol having a functionality of at least 3.0 selected from (i) the reaction product of ethylene diamine and propylene oxide having a molecular weight of 275–300 and a hydroxyl number of about 750–800, and (ii) the reaction product of diethylenetriamine and propylene oxide having a molecular weight of 400–600 and a hydroxyl number of about 450–800;

by mixing together said reactants and inert organic liquid diluent;

(b) ceasing said mixing before the onset of gelation;

(c) thereafter maintaining the product of step (a) in a quiescent state while the polyurethane is precipitated; and (d) removing the inert organic liquid diluent.

[8. The polyurethane structure prepared by the process of claim 2.]

References Cited

The following references, cited by the Examiner, are of record in the patented file of this patent or the original patent.

UNITED STATES PATENTS

| | | | |
|---|---|---|---|
| 3,622,527 | 11/1970 | Dieterich | 260—2.5 |
| 3,519,577 | 7/1970 | Olson | 260—2.5 |
| 3,560,447 | 2/1971 | Bingham | 260—77.5 |
| 3,042,631 | 7/1962 | Strandskov | 260—2.5 |
| 3,137,662 | 6/1964 | Recktenwald | 260—2.5 |
| 3,236,812 | 2/1966 | McElroy | 260—75 |
| 3,312,666 | 4/1967 | Knipp et al. | 260—75 |

DONALD E. CZAJA, Primary Examiner

H. S. COCKERAM, Assistant Examiner

U.S. Cl. U.S.

47—48.5; 161—190 KP; 206—46; 223—1; 252—62; 260—77.5 AQ